(12) United States Patent
Ogawa et al.

(10) Patent No.: US 7,649,576 B2
(45) Date of Patent: Jan. 19, 2010

(54) LIQUID CRYSTAL TELEVISION AND DISPLAY DEVICE

(75) Inventors: Masuo Ogawa, Daito (JP); Hiroki Ishii, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 776 days.

(21) Appl. No.: 11/300,685

(22) Filed: Dec. 14, 2005

(65) Prior Publication Data

US 2006/0221263 A1 Oct. 5, 2006

(30) Foreign Application Priority Data

Dec. 14, 2004 (JP) .............................. P2004-360932

(51) Int. Cl.
*H04N 5/64* (2006.01)
(52) U.S. Cl. .................. 348/794; 348/790; 348/836; 248/917
(58) Field of Classification Search .......... 348/836, 348/794, E5.128, 751, 787, 825, 790–791; 248/454, 474, 472, 917, 919, 456; 361/681–682; *H04N 5/64*

See application file for complete search history.

(56) References Cited

U.S. PATENT DOCUMENTS 6,570,627 B1 * 5/2003 Chang ..................... 348/794
6,651,943 B2 * 11/2003 Cho et al. ................ 248/122.1
6,971,622 B2 * 12/2005 Ziegler et al. .............. 248/454

FOREIGN PATENT DOCUMENTS

| JP | 11-331735 | 11/1999 |
|---|---|---|
| JP | 2002-32028 | 1/2002 |
| JP | 3096746 | 7/2003 |

OTHER PUBLICATIONS

Patent Abstracts of Japan, Publication No. 11-331735, Publication Date Nov. 30, 1999, 2 pages.
Patent Abstracts of Japan, Publication No. 2002-032028, Publication Date Jan. 31, 2002, 2 pages.

* cited by examiner

*Primary Examiner*—Trang U Tran
(74) *Attorney, Agent, or Firm*—Osha • Liang LLP

(57) ABSTRACT

A display device includes a casing of which a bottom portion is in contact with a setting face when the display device is set; a base member attached to a back face of the casing; and a stand member attached pivotably to the base member. The stand member supports a main body in cooperation with the bottom portion of the casing in an opened state and is capable of brought into a closed state when the stand member is not used. The bottom portion includes a first inclined face being in surface contact with the setting face in the opened state, and a second inclined face inclined relative to a horizontal direction when the casing is vertically erected. The stand member includes a contact portion having a third inclined face being in surface contact with the setting face in the opened state.

5 Claims, 6 Drawing Sheets

LIQUID CRYSTAL TELEVISION AND DISPLAY DEVICE

BACKGROUND OF THE INVENTION

1. Field of the Invention

The present invention relates to a liquid crystal television and a display device, particularly relates to a liquid crystal television and a display device having a stand member.

2. Description of the Related Art

In a related art, a display device having a stand member is known.

Japanese Utility Model Registration No. 3,096,746 discloses a liquid crystal television (display device) provided with a rubber member for preventing slip at a bottom face of the liquid crystal television and provided with a ring member made of rubber for preventing slip formed in a cylindrical shape at a stand member.

Further, JP-A-11-331735 discloses a flat type display device having a total of four stand members in which two of extendable and angle fixed support legs (stand members) having castors are attached to direct to a lower side of a display unit portion and two of extendable and angle variably support legs (stand members) attached to a back face of the display unit portion.

Further, JP-A-2002-32028 discloses a display device having a total of three stand members in which two slide support legs (stand members) made of resin are provided on both sides of a lower portion of a main body and one leg made of rubber formed with one pivoting support leg (stand member) pivoted relative to a back face of the main body in a cylindrical shape.

Further, in a related art, a liquid crystal television is known as an example of a display device. FIG. 8 is a rear view showing a total constitution of the liquid crystal television of the related art. FIG. 9 is a side view in using a stand member of the liquid crystal television of the related art shown in FIG. 8. FIG. 10 is a view partially enlarging a contact portion of the stand member of the liquid crystal television of the related art shown in FIG. 8. First, a structure of a liquid crystal television 110 according to an example of the related art will be explained in reference to FIG. 8 to FIG. 10.

The liquid crystal television 110 of the related art is provided with a resin frame 102 arranged to surround a side face and a back face of a liquid crystal display unit 101 (refer to FIG. 9) as shown in FIG. 8 and FIG. 9. Further, as shown in FIG. 9, the resin frame 102 includes a back face 102a and a bottom face 102b. Further, the bottom face 102b of the resin frame 102 is formed to be in parallel with a horizontal direction (X2 direction in FIG. 9) in a state where the liquid crystal television 110 is erected vertically. Further, the back face 102a of the resin frame 102 is attached with a base member 103. The base member 103 is pivotably attached with a stand member 104. Further, as shown in FIG. 10, the stand member 104 is provided with a contact portion 104a being in linear contact with a setting face 150 in an opened state when the stand member 104 is used. Further, as shown in FIG. 8, the base member 103 is provided with four screw holes 103a. As shown in FIG. 9, the base member 103 is mounted to the back face 102a of the resin frame 102 by inserting and fastening four screws 105 into the screw holes 103a of the base member 103.

FIG. 11 is a side view when the stand member of the liquid crystal television of the related art shown in FIG. 8 is not used. Next, an explanation will be given of a method of setting the liquid crystal television 110 according to the example of the related art and a state where the stand member is not used, in reference to FIG. 9 to FIG. 11.

First, when the liquid crystal television 110 is set on the setting face 150 as shown in FIG. 9, the stand member 104 supports the liquid crystal television 110 in the opened state where the stand member 104 is pivoted relative to the base member 103 by a predetermined angle. At this occasion, the bottom face 102b of the resin frame 102 and the contact portion 104a of the stand member 104 (refer to FIG. 10) are in linear contact with the setting face 150. On the other hand, when the stand member 104 is not used, as shown in FIG. 11, the stand member 104 is brought into a closed state.

SUMMARY OF THE INVENTION

According to the liquid crystal television 110 of the related art shown in FIG. 8 to FIG. 11, when set on the setting face 150, the bottom face 102b of the resin frame 102 and the contact portion 104a of the stand member 104 are linearly brought into contact with the setting face 150 and therefore, there poses a problem that, for example, when the setting face 150 is inclined, the liquid crystal television 110 is liable to be slipped relative to the setting face 150. Further, the bottom face 102b of the resin frame 102 formed to be in parallel with the horizontal direction (X2 direction in FIG. 11) in the state where the liquid crystal television 110 is vertically erected, can be set on the setting face 150 and therefore, even in an unstable state in which the stand member 104 is not used, the liquid crystal television 110 is set thereon by the bottom face 102b of the resin frame 102. In this case, there poses a problem that the liquid crystal television 110 is broken owing to the fact that the liquid crystal television 110 set in the unstable state falls down.

Further, according to the display device disclosed in Japanese Utility Model Registration No. 3,096,746, since the bottom face of the liquid crystal television is provided with the rubber member for preventing slip and therefore, there poses a problem that a number of parts is increased by that amount. Further, in setting the liquid crystal television, the ring member made of rubber for preventing slip formed in the cylindrical shape of the stand member is in linear contact with the setting face and therefore, when, for example, the setting face is inclined, there poses a problem that the liquid crystal television is liable to slip relative to the setting face.

Further, according to the flat type display device disclosed in JP-A-11-331735, in setting the flat type display device, the device is set on the setting face by the angle fixed support leg (stand member) having the castor and therefore, when, for example, the setting face is inclined, there poses a problem that the flat type display device is liable to slip relative to the setting face. Further, it is necessary to provide a total of four stand members and therefore, there poses a problem that a number of parts increases.

Further, according to the display device disclosed in JP-A-2002-32028, in setting the display device, the leg made of rubber formed in the cylindrical shape of the pivoting support leg (stand member) is in linear contact with the setting face and therefore, when, for example, the setting face is inclined, there poses a problem that the display device is liable to slip relative to the setting face. Further, it is necessary to provide a total of three stand members and therefore, there poses a problem that a number of parts increases.

The invention has been carried out in view of the above circumstances and provides a liquid crystal television and a display device capable of restraining slip and fall down relative to a setting face in using a stand member and preventing the stand member from being set when the stand member is not used without increasing a number of parts.

According to a first aspect of the invention, there is provided a liquid crystal television including; a casing which constitutes a main body and of which a bottom portion is in contact with a setting face when the liquid crystal television is set on the setting face; a base member attached to a back face of the casing; and a stand member pivotably attached to the base member. The stand member supports the main body in cooperation with the bottom portion of the casing in an opened state where the stand member is pivoted relative to the base member by a predetermined angle when the stand member is used. And the stand member is capable of brought into a closed state where the stand member is closed relative to the base member when the stand member is not used. The bottom portion of the casing includes a first inclined face being in surface contact with the setting face in the opened state, and a second inclined face inclined relative to a horizontal direction by a predetermined angle when the casing is vertically erected. The stand member includes a pair of contact portions at a left and a right side relative to a center line in a vertical direction of the stand member. The contact portions are made of rubber and have a third inclined face being in surface contact with the setting face in the opened state. The stand member is only one member and is provided so that the stand member projects from the bottom portion of the casing to a lower side by a predetermined length in the closed state.

According to the liquid crystal television according to the first aspect of the invention, as described above, by providing the first inclined face being in surface contact with the setting face in the opened state when the stand member is used at the bottom portion of the casing, and providing the contact portion having the third inclined face being in surface contact with the setting face in the opened state when the stand member is used at the stand member, in comparison with a case of bringing the bottom portion of the casing and the stand member into linear contact with the setting face, a contact area of the contact portion and the bottom portion of the casing and the setting face is increased by portions of the first inclined face and the third inclined face being in surface contact therewith and therefore, even when the setting face is inclined, the liquid crystal television can further be restrained from being slipped relative to the setting face when the stand member is used, and the liquid crystal television can be restrained from falling down. Further, by providing the second inclined face inclined relative to the horizontal direction by the predetermined angle in the state where the casing is vertically erected at the bottom portion of the casing, when the bottom portion of the casing is going to be set on the setting face in the state where the bottom portion of the casing is vertically erected when the stand member is not used, the liquid crystal television can be made to be easy to fall down and therefore, the liquid crystal television can be prevented from being set in an unstable state in which the stand member is not used. As a result, the liquid crystal television can be prevented from being broken owing to the fact that the liquid crystal television set in the unstable state falls down when the stand member is not used. Further, by providing the first inclined face being in surface contact with the bottom portion of the casing, even when the bottom portion of the casing is not provided with a rubber member for preventing slip, the liquid crystal television can further be restrained from being slipped relative to the setting face in the opened state when the stand member is used and therefore, a number of parts can be restrained from being increased. Further, by the contact portion of the only one stand member and the bottom portion of the casing, the liquid crystal television can be set and therefore, it is not necessary to provide a plurality of the stand members. Also thereby, a number of parts can be restrained from being increased.

Further, according to the first aspect, by providing the stand member to project from the bottom portion of the casing to the lower side by the predetermined length in the closed state, when the bottom portion of the casing is going to be set on the setting face in the state where the bottom portion of the casing is vertically erected when the stand member is not used, the contact portion provided on the lower side of the stand member can be in linear contact with the setting face. Thereby, the liquid crystal television can further be made to fall down and therefore, the liquid crystal television can further be prevented from being set in the unstable state when the stand member is not used. Further, by providing a pair of the contact portions of the stand member at the left and the right side relative to the center line in the vertical direction of the stand member, the liquid crystal television can further be restrained from being slipped relative to the setting face in the opened state when the stand member is used. Further, by forming the contact portion of the stand member by rubber, the liquid crystal television can further be restrained from being slipped relative to the setting face in the opened state when the stand member is used.

According to a second aspect of the invention, there is provided a display device including, a casing which constitutes a main body and of which a bottom portion is in contact with a setting face when the display device is set; a base member attached to a back face of the casing; and a stand member attached pivotably to the base member. The stand member supports the main body in cooperation with the bottom portion of the casing in an opened state where the stand member is pivoted by a predetermined angle relative to the base member when the stand member is used. And the stand member is capable of brought into a closed state where the stand member is closed relative to the base member when the stand member is not used. The bottom portion of the casing includes a first inclined face being in surface contact with the setting face in the opened state, and a second inclined face inclined relative to a horizontal direction by a predetermined angle when the casing is vertically erected. And the stand member includes a contact portion having a third inclined face being in surface contact with the setting face in the opened state.

According the display device according to the second aspect of the invention, as described above, by providing the first inclined face being in contact with the setting face in the opened state when the stand member is used at the bottom portion of the casing and providing the contact portion having the third inclined face being in surface contact with the setting face in the opened state when the stand member is used, in comparison with a case of bringing the bottom portion of the casing and the stand member into linear contact with the setting face, a contact area of the contact portion and the bottom portion of the casing and the setting face is increased by portions of the first inclined face and the third inclined face being in surface contact therewith and therefore, the display device can further be restrained from being slipped relative to the setting face in the opened state when the stand member is used, and the display device can be restrained from falling down. Further, by providing the second inclined face inclined relative to the horizontal direction by the predetermined angle in the state where the casing is vertically erected, when the display device is going to be set on the setting face in the state where the bottom portion of the casing is vertically erected when the stand member is not used, the display device can be made to be easy to fall down and therefore, the display device can be prevented from being set in an unstable state when the stand member is not used. As a result, when the stand member is not used, the display device can be prevented from being destroyed owing to the fact that the display device set in the unstable state falls down when the stand member is not used. Further, by providing the first inclined face being in surface contact with the bottom portion of the casing, even when the bottom portion of the casing is not provided with a rubber member for preventing slip, the display device can further be restrained from being slipped relative to the setting face in the opened state when the stand member is used and therefore, a number of parts can be restrained from being increased. Further, by the contact portion of the only one stand member and the bottom portion of the casing, the display device can be set and therefore, it is not necessary to provide a plurality of the stand members. Also thereby, a number of parts can be restrained from being increased.

According to the display device according to the second aspect, preferably, the stand member is provided so that the stand member projects from the bottom portion of the casing to a lower side by a predetermined length in the closed state when the stand member is not used. When constituted in this way, in the case in which the display device is going to be set on the setting face in the state where the bottom portion of the casing is vertically erected when the stand member is not used, the contact portion provided on the lower side of the stand member can be in surface contact with the setting face. Thereby, the liquid crystal television can further be made to easy to fall down and therefore, the liquid crystal television can further be prevented from being set in the unstable state when the stand member is not used.

According to the display device according to the second aspect, preferably, a pair of the contact portions of the stand member is provided at a left and a right side relative to a center line in a vertical direction of the stand member. When constituted in this way, the display device can further be restrained from being slipped relative to the setting face in the opened state when the stand member is used.

According to the display device according to the second aspect, preferably, the contact portion of the stand member is formed by rubber. When constituted in this way, the display device can further be restrained from being slipped relative to the setting face in the opened state when the stand member is used.

BRIEF DESCRIPTION OF THE DRAWINGS

Embodiments of the present invention will be described in detail based on the following figures, wherein.

DETAILED DESCRIPTION OF THE INVENTION

An embodiment of the invention will be explained in reference to the drawings as follows. Further, in the following embodiment, an explanation will be given by taking an example of a liquid crystal television as an example of a display device.

Figure 1:
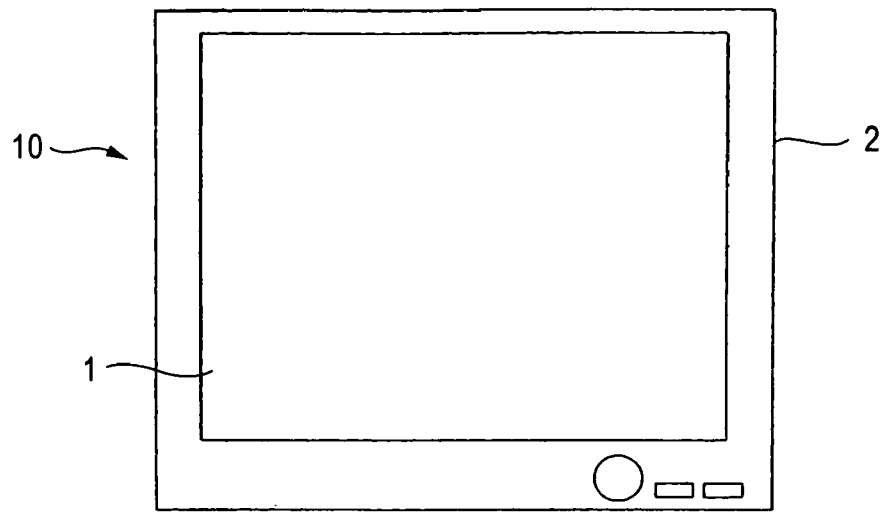
FIG. 1 is a front view showing a total constitution of a liquid crystal television according to an embodiment of the invention.
Figure 2:
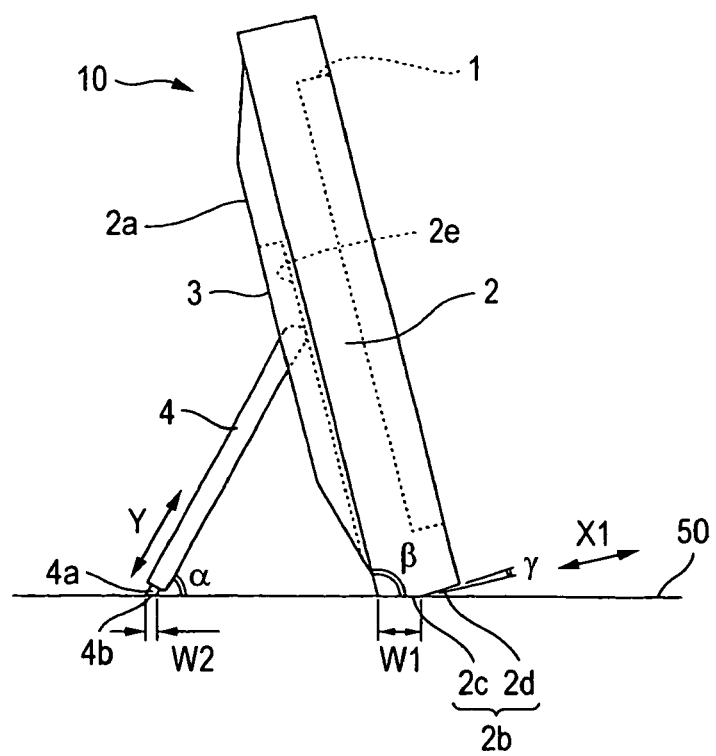
FIG. 2 is a side view in using a stand member of the liquid crystal television according to the embodiment shown in FIG. 1.
Figure 3:
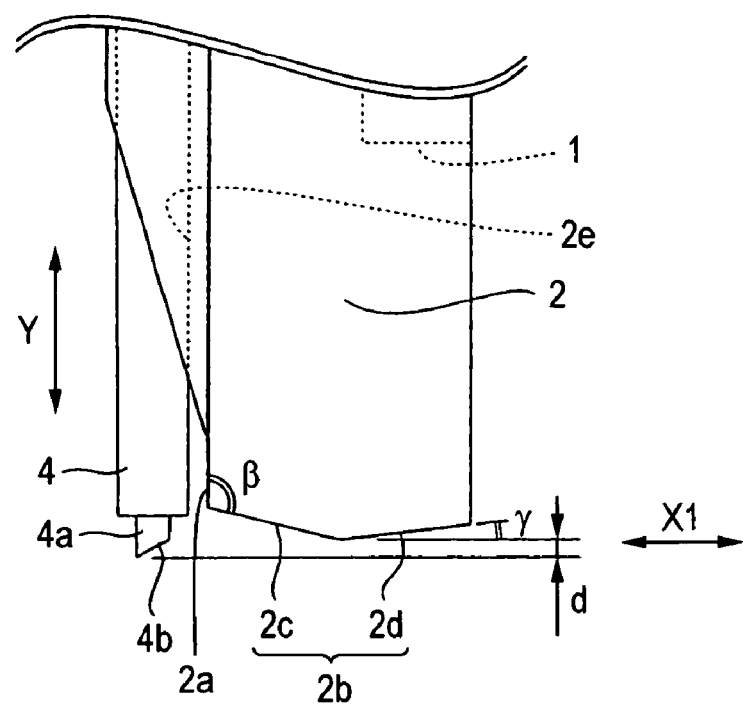
FIG. 3 is a partially enlarged view showing the liquid crystal television according to the embodiment shown in FIG. 1.
Figure 4:
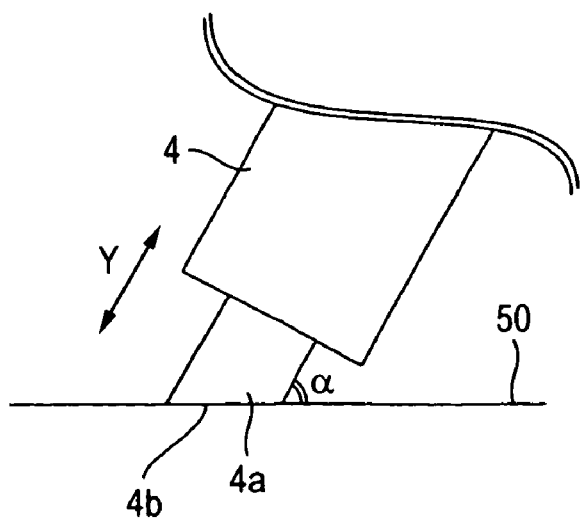
FIG. 4 is a partially enlarged view showing a contact portion of the liquid crystal television according to the embodiment shown in FIG. 1.
Figure 5:
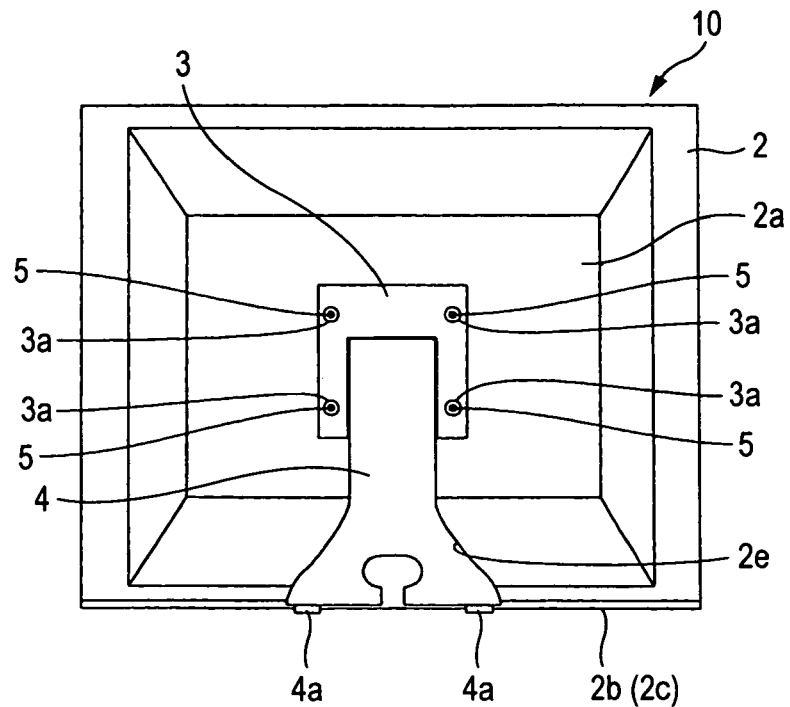
FIG. 5 is a rear view showing the liquid crystal television according to the embodiment shown in FIG. 1.

FIG. 1 is a front view showing a total constitution of a liquid crystal television according to an embodiment of the invention. FIG. 2 is a side view in using a stand member of the liquid crystal television according to the embodiment shown in FIG. 1. FIG. 3 to FIG. 5 are views for explaining details of a structure of the liquid crystal television according to the embodiment shown in FIG. 1. First, a structure of a liquid crystal television 10 according to the embodiment of the invention will be explained in reference to FIG. 1 to FIG. 5.

As shown in FIG. 1 and FIG. 2, the liquid crystal television 10 according to the embodiment of the invention is provided with a resin frame 2 (refer to FIG. 2) arranged to surround a side face and a back face of a liquid crystal display unit 1 having a display region of 14 inches. Further, the resin frame 2 is an example of a 'casing' of the invention.

Here, according to the embodiment, as shown in FIG. 2, the resin frame 2 includes a back face 2a and a bottom portion 2b. Further, as shown in FIG. 3, the bottom portion 2b of the resin frame 2 is provided with an inclined face 2c inclined relative to the back face 2a of the resin frame 2 by an angle β (100° to 120°). As shown in FIG. 2, the inclined face 2c is brought into contact with a setting face 50 in a face-like shape in an opened state in using a stand member 4 and is provided with a width W1. Further, the bottom portion 2b of the resin frame 2 is provided with an inclined face 2d inclined relative to a horizontal direction (X1 direction in FIG. 3) by an angle γ (5° to 20°) in a state where the liquid crystal television 10 is vertically erected. Further, the inclined face 2c is an example of a 'first inclined face' of the invention and the inclined face 2d is an example of a 'second inclined face' of the invention.

Further, as shown in FIG. 2, a base member 3 is attached to a containing portion 2e of the back face 2a of the resin frame 2. The base member 3 is pivotably attached with a stand member 4 made of resin.

Further, according to the embodiment, as shown in FIG. 3, the stand member 4 is arranged to project from the bottom portion 2b of the resin frame 2 to a lower side by a length d. Further, as shown in FIG. 4, the stand member 4 is provided with a contact portion 4a made of rubber brought into contact with the setting face 50 in a face-like shape in an opened state in using the stand member 4. As shown in FIG. 5, a pair of the contact portions 4a of the stand member 4 is provided at a left and a right side relative to a center of a width of the stand member 4. Further, as shown in FIG. 4, the contact portion 4a of the stand member 4 is provided with an inclined face 4b inclined relative to a length direction (Y direction in FIG. 4) of the stand member 4 by an angle α (50° to 70°). The inclined face 4b is provided with a width W2 as a length brought into contact with the setting face. Further, the inclined face 4b is an example of a 'third inclined face' of the invention.

Further, as shown in FIG. 5, the base member 3 is provided with four screw holes 3a. The base member 4 is mounted to be embedded to the back face 2a of the resin frame 2 by inserting and fastening four screws 5 into the screw holes 3a of the base member 3.

Figure 6:
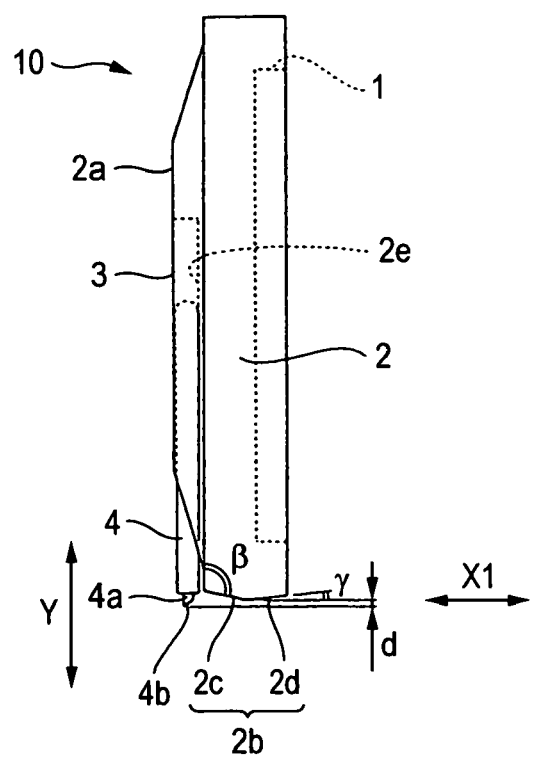
FIG. 6 is a side view when the stand member of the liquid crystal television according to the embodiment shown in FIG. 1 is not used.

FIG. 6 is a side view when the stand member of the liquid crystal television according to the embodiment shown in FIG. 1 is not used. Next, an explanation will be given of a method of setting the liquid crystal television 10 according to the embodiment of the invention and a state when the stand member is not used in reference to FIG. 2 to FIG. 4 and FIG. 6.

First, when the liquid crystal television 10 is set on the setting face 50 as shown in FIG. 2, the stand member 4 supports the liquid crystal television 10 in the opened state of being pivoted by a predetermined angle relative to the back face 2a (base member 3) of the resin frame 2.

At this occasion, according to the embodiment, the inclined face 2c (refer to FIG. 3) of the bottom portion 2b of the resin frame 2 and the inclined face 4b of the contact portion 4a (refer to FIG. 3) of the stand member 4 are in surface contact with the setting face 50. On the other hand, when the stand member 4 is not used, as shown in FIG. 6, the stand member 4 is brought into a closed state of being closed relative to the base member 3. At this occasion, the stand member 4 is brought into a state of being projected from the bottom portion 2b of the resin frame 2 to a lower side by the length d.

According to the embodiment, as described above, by providing the inclined face 2c being in surface contact with the setting face 50 in the opened state in using the stand member 4 at the bottom portion 2b of the resin frame 2 and providing the contact portion 4a having the inclined face 4b being in surface contact with the setting face 50 in the opened state in using the stand member 4 at the stand member 4, in comparison with the case of bringing the bottom portion 2b of the resin frame 2 and the stand member 4 into linear contact with the setting face 50, a contact area of the contact portion 4a and the bottom portion 2b of the resin frame 2 and the setting face 50 is increased by portions of the inclined face 2c and the inclined face 4b being in surface contact therewith and therefore, even when the setting face 50 is inclined by about 20° relative to the horizontal direction, the liquid crystal television 10 can further be restrained from being slipped relative to the setting face 50 in the opened state in using the stand member 4 and the liquid crystal television 10 can be restrained from falling down. Further, by providing the inclined face 2d inclined relative to the horizontal direction (X1 direction in FIG. 2) by the angle γ (5° to 20°) in the state where the resin frame 2 is vertically erected at the bottom portion 2b of the resin frame 2, when the liquid crystal television 10 is going to be set on the setting face 50 in the state where the bottom portion 2b of the resin frame 2 is vertically erected when the stand member 4 is not used, the liquid crystal television 10 can be made to be easy to fall down and therefore, the liquid crystal television 10 can be prevented from being set in an unstable state in which the stand member 4 is not used. As a result, the liquid crystal television 10 can be prevented from being destroyed owing to the fact that the liquid crystal television 10 set in the unstable state falls down when the stand member 4 is not used. Further, by providing the inclined face 2c being in surface contact therewith at the bottom portion 2b of the resin frame 2, even when the bottom portion 2b of the resin frame 2 is not provided with a rubber member for preventing slip, the liquid crystal television 10 can further be restrained from being slipped relative to the setting face 50 when the stand member 4 is used and therefore, a number of parts can be restrained from being increased. Further, the liquid crystal television 10 can be set by the contact portion 4a of the single stand member 4 and the bottom portion 2b of the resin frame 2 and therefore, it is not necessary to provide a plurality of the stand members 4. Also thereby, a number of parts can be restrained from being increased.

Further, according to the embodiment, by providing the stand member 4 so that the stand member projects from the bottom portion 2b of the resin frame 2 to the lower side by the length d in the closed state, when the liquid crystal television 10 is going to be set on the setting face 50 in the state where the bottom portion 2b of the resin frame 2 is vertically erected when the stand member 4 is not used, the contact portion 4a provided on the lower side of the stand member 4 can be in linear contact with the setting face 50. Thereby, the liquid crystal television 10 can further be made to be easy to fall down and therefore, the liquid crystal television 10 can further be prevented from being set in the unstable state in which the stand member 4 is not used.

Further, according to the embodiment, by providing the pair of contact portions 4a of the stand member 4 at the and the right side relative to the center line in the vertical direction of the stand member 4, the liquid crystal television 10 can further be restrained from being slipped relative to the setting face 50 in the opened state in using the stand member 4.

Further, according to the embodiment, by forming the contact portion 4a of the stand member 4 by rubber, the liquid crystal television 10 can further be restrained from being slipped relative to the setting face 50 in the opened state when the stand member 4 is used.

Further, the embodiment disclosed this time is an exemplification in all the aspects and is to be regarded not to be restrictive. The range of the invention is indicated not by the explanation of the above-described embodiment but the scope of claims and includes all the changes within the significance and the range of equivalency with the scope of claims.

For example, although according to the above-described embodiment, the liquid crystal television is shown as an example of the display device, the invention is not limited thereto but is applicable to other display device of a plasma panel display (PDP) other than the liquid crystal television so far as the apparatus is the display device.

Figure 7:
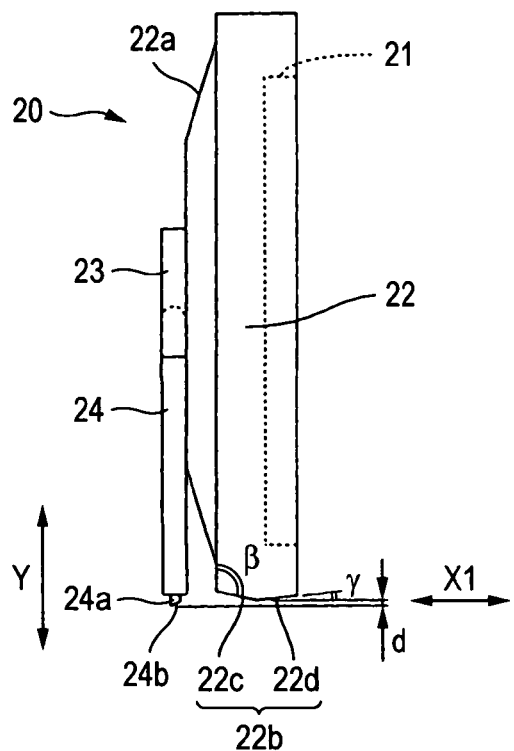
FIG. 7 is a side view showing a liquid crystal television according to a modified example of the embodiment shown in FIG. 1.
Figure 8:
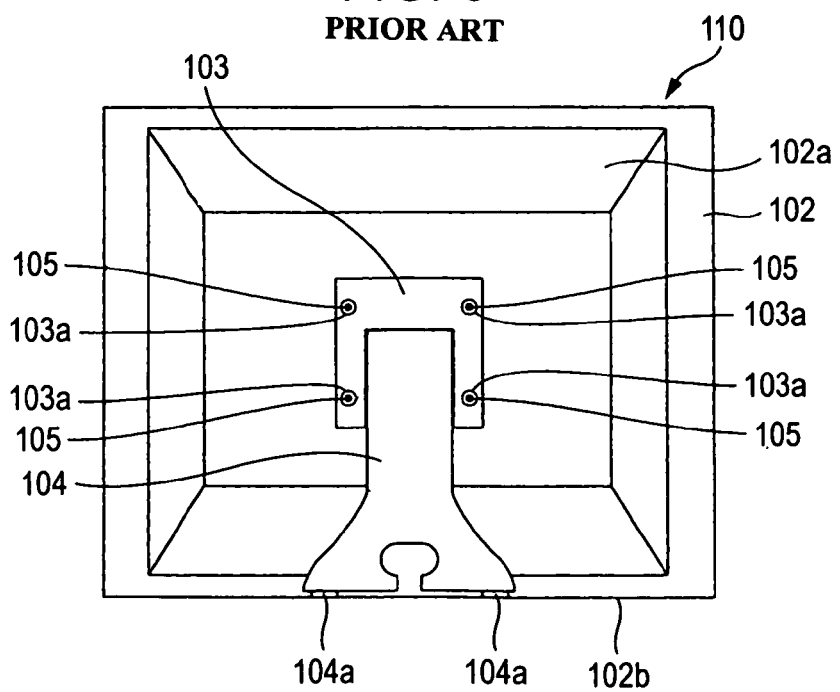
FIG. 8 is a rear view showing a total constitution of a liquid crystal television according to an example of a related art.
Figure 9:
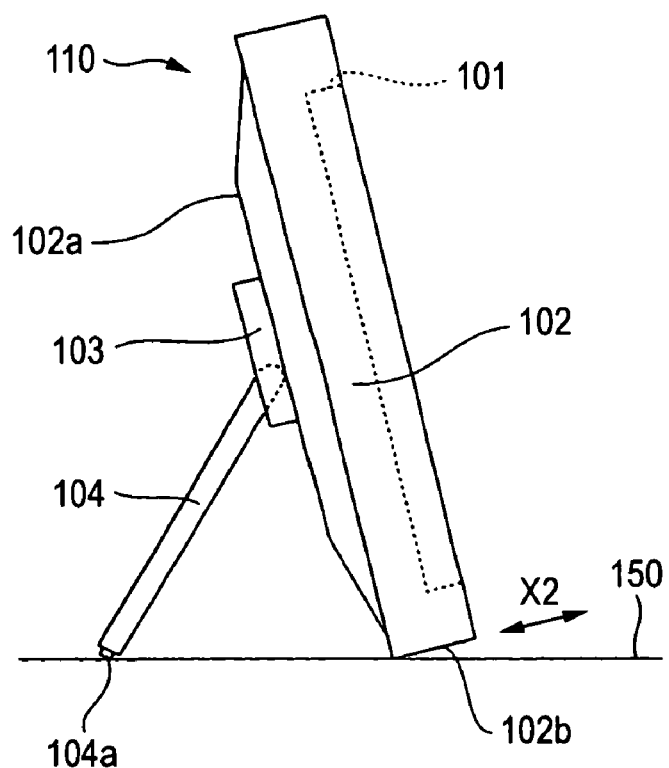
FIG. 9 is a side view when a stand member of the liquid crystal television according to the example of the related art shown in FIG. 8 is used.
Figure 10:
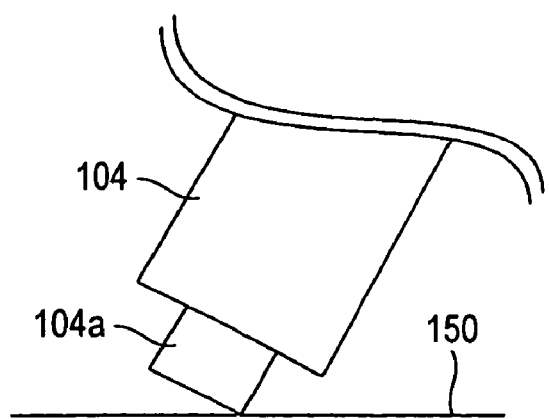
FIG. 10 is a partially enlarged view of a contact portion of the liquid crystal television according to the example of the related art shown in FIG. 8.
Figure 11:
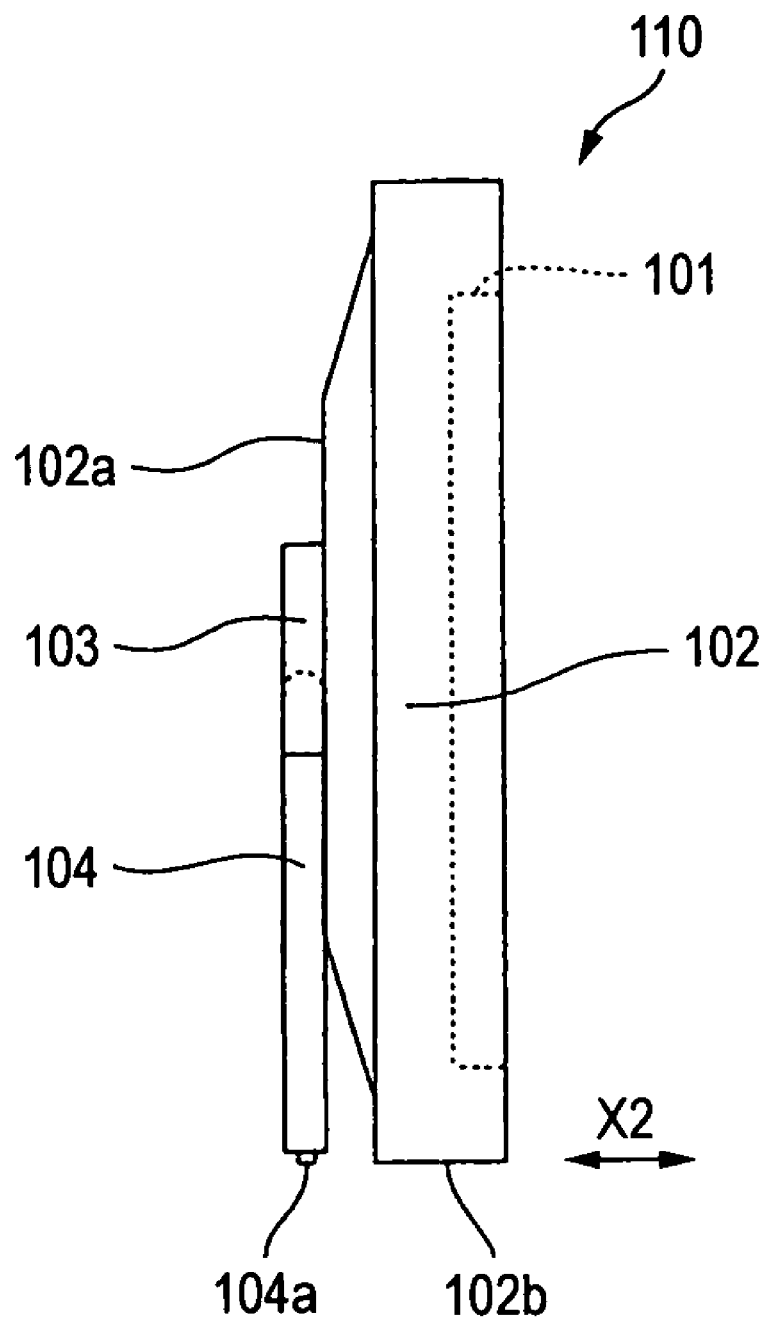
FIG. 11 is a side view when the stand member of the liquid crystal television according to the example of the related art shown in FIG. 8 is not used.

Further, although according to the above-descried embodiment, an example of attaching to embed the base member 3 into the containing portion 2e of the back face 2a of the resin frame 2 is shown, the invention is not limited thereto but as in a modified example shown in FIG. 7, a surface of a back face 22a of a resin frame 22 may be attached with a base member 23 pivotably attached with a stand member 24. Furthers according to the modified example shown in FIG. 7, similar to the above-described embodiment, a liquid crystal television 20 is provided with a liquid crystal display unit 21, a bottom portion 22b having inclined faces 22c and 22d and a contact portion 24a having an inclined face 24b.

The entire disclosure of Japanese Patent Application No. 2004-360932 filed on Dec. 14, 2004 including specification, claims, drawings and abstract is incorporated herein be reference in its entirety.

What is claimed is:

1. A liquid crystal television comprising:
a casing which constitutes a main body and includes a displaying face and a bottom portion that is in contact with a setting face when the liquid crystal television is set on the setting face;
a base member attached to a back face of the casing; and
a stand member pivotably attached to the base member, the stand member supporting the main body in cooperation with the bottom portion of the casing in an opened state where the stand member is pivoted relative to the base member by a predetermined angle when the stand member is used, and the stand member being capable of brought into a closed state where the stand member is closed relative to the base member when the stand member is not used,
wherein the bottom portion of the casing includes:
a first inclined face inclined with respect to a direction orthogonal to an extending direction of the displaying face, the first inclined face being in surface contact with the setting face in the opened state; and
a second inclined face inclined with respect to the direction orthogonal to the extending direction of the displaying face by a predetermined angle when the casing is vertically erected,
wherein the stand member includes a pair of contact portions at a left and a right side relative to a center line in a vertical direction of the stand member, the contact portions made of rubber and having a third inclined face inclined with respect to the direction orthogonal to the extending direction of the displaying face in the closed state, the third inclined face being in surface contact with the setting face in the opened state, and
wherein the stand member is only one member and is provided so that the stand member projects from the bottom portion of the casing to a lower side by a predetermined length in the closed state.

2. A display device comprising:
a casing which constitutes a main body and includes a displaying face and a bottom portion that is in contact with a setting face when the display device is set;
a base member attached to a back face of the casing; and
a stand member attached pivotably to the base member, the stand member supporting the main body in cooperation with the bottom portion of the casing in an opened state where the stand member is pivoted by a predetermined angle relative to the base member when the stand member is used, and the stand member being capable of brought into a closed state where the stand member is closed relative to the base member when the stand member is not used,
wherein the bottom portion of the casing includes:
a first inclined face inclined with respect to a direction orthogonal to an extending direction of the displaying face, the first inclined face being in surface contact with the setting face in the opened state; and
a second inclined face inclined with respect to the direction orthogonal to the extending direction of the displaying face by a predetermined angle when the casing is vertically erected, and
wherein the stand member includes a contact portion having a third inclined face inclined with respect to the direction orthogonal to the extending direction of the displaying face in the closed state, the third inclined face being in surface contact with the setting face in the opened state.

3. The display device according to claim 2, wherein the stand member is provided so that the stand member projects from the bottom portion of the casing to a lower side by a predetermined length in the closed state.

4. The display device according to claim 2, wherein the contact member includes a pair of the contact members at a left and a right side relative to a center line in a vertical direction of the stand member.

5. The display device according to claim 2, wherein the contact portion is made of rubber.

* * * * *